(12) United States Patent
Nallakrishnan (10) Patent No.: US 9,380,748 B2
(45) Date of Patent: Jul. 5, 2016

(54) VEGETATION PROTECTION SYSTEM

(71) Applicant: Anirudh Nallakrishnan, Willowbrook, IL (US)

(72) Inventor: Anirudh Nallakrishnan, Willowbrook, IL (US)

(73) Assignee: RAVI NALLAKRISHNAN REVOCABLE TRUST, Willowbrook, IL (US)

( * ) Notice: Subject to any disclaimer, the term of this patent is extended or adjusted under 35 U.S.C. 154(b) by 77 days.

(21) Appl. No.: 14/185,309

(22) Filed: Feb. 20, 2014

(65) Prior Publication Data

US 2014/0261596 A1 Sep. 18, 2014

Related U.S. Application Data

(60) Provisional application No. 61/793,373, filed on Mar. 15, 2013, provisional application No. 61/881,449, filed on Sep. 24, 2013.

(51) Int. Cl.
| | |
|---|---|
| *A01G 13/02* | (2006.01) |
| *A01G 13/04* | (2006.01) |
| *A01G 13/00* | (2006.01) |
| *A45B 23/00* | (2006.01) |

(52) U.S. Cl.
CPC ........ *A01G 13/0206* (2013.01); *A01G 13/0212* (2013.01); *A01G 13/043* (2013.01); *A01G 2013/046* (2013.01); *A45B 2023/0012* (2013.01)

(58) Field of Classification Search
CPC ... A01G 13/00; A01G 13/02; A01G 13/0212; A01G 13/0206; A01G 13/04; A01G 13/043; A01G 2013/046; A45B 2200/1045
See application file for complete search history.

(56) References Cited

U.S. PATENT DOCUMENTS

| | | | | |
|---|---|---|---|---|
| 1,351,249 | A * | 8/1920 | Honstedt | 47/23.2 |
| 3,706,160 | A * | 12/1972 | Deibert | 47/23.2 |
| 4,144,899 | A * | 3/1979 | Kays | A01G 9/16 135/115 |
| 4,194,319 | A * | 3/1980 | Crawford | 47/21.1 |
| 6,088,953 | A * | 7/2000 | Morgan | 47/31 |
| 6,609,332 | B1 * | 8/2003 | Nali | 47/25.1 |
| 7,162,833 | B2 * | 1/2007 | Faris | 47/58.1 LS |
| 8,079,176 | B1 * | 12/2011 | Thead et al. | 47/29.6 |
| 8,201,359 | B1 * | 6/2012 | Bryan, Jr. | 47/22.1 |
| 8,615,923 | B2 * | 12/2013 | Perricone | 47/22.1 |
| 2008/0048051 | A1 * | 2/2008 | Chang | 239/289 |
| 2014/0026475 | A1 * | 1/2014 | Centeno | 47/29.5 |

\* cited by examiner

*Primary Examiner* — David R Dunn
*Assistant Examiner* — Danielle Jackson
(74) *Attorney, Agent, or Firm* — Wood, Phillips, Katz, Clark & Mortimer

(57) ABSTRACT

A protective system for vegetation has an underground housing from which a protective canopy can be deployed. The canopy unfurls as it is deployed and its position above ground can be adjusted after it is fully unfurled. After use, the canopy can be furled and lowered back into the housing. A liquid delivery system allows use of anti-freeze or fertilizer to be delivered via the system. Deployment of the system can be done manually or automatically in response to a selected signal.

13 Claims, 8 Drawing Sheets

VEGETATION PROTECTION SYSTEM

CROSS-REFERENCE TO RELATED APPLICATIONS

This application claims priority of U.S. Provisional Application Ser. Nos. 61/881,449, filed Sep. 24, 2013, and 61/793,373, filed Mar. 15, 2013, the disclosures of which are incorporated herein by reference.

BACKGROUND OF THE INVENTION

Field of the Invention

The present invention relates to an apparatus and system for protecting vegetation and, more particularly, to a protective canopy system that deploys in response to an external signal provided manually or automatically.

Throughout a typical growing season, plants are susceptible to damage caused by unseasonal or unpredicted changes in weather. One example is the damage caused to crops by early frosts. A premature frost may damage or kill young plants, and may damage or destroy ripening crops. The product of an entire growing season may be lost due to several days of damaging weather near harvest time.

Damaging frost occurs when a drop in temperature causes moisture in the air to condense on plants and then to freeze. If a temperature drop is sufficient, the fluids inside the plant itself may also freeze, rupturing the cells and causing loss of the crop.

Past efforts to avoid such damage have centered around using such expedients as smudge pots and gas-powered heaters in an attempt to keep the surface of the earth close to the plants warm enough to prevent the formation of frost, using covers such as tarps or plastic to cover the crops in an attempt to retain the heat being given off by the earth and to avoid the deposit of freezing liquid on the plants.

Such methods are inefficient, difficult to use, labor-intensive, time consuming and may cause physical damage to the crops such as when the weight of the covering is sufficient to crush or break individual plants.

SUMMARY OF THE INVENTION

The present invention provides a protective canopy permanently installed in a field, preferably underground. The canopy is deployed to provide a cover for the crop when damaging weather conditions occur. Such canopies can be arranged in arrays to cover a large ground area and can be adjusted to remain a selective distance above ground level to provide adequate protection.

Individual canopies can be deployed in response to a manually-given signal or in response to a signal set to be transmitted automatically upon the occurrence of certain weather conditions. A built-in irrigation system may be used to supply a spray of liquid to feed and warm the plants during inclement weather.

While the following describes a preferred embodiment or embodiments of the present invention, it is to be understood that this description is made by way of example only and is not intended to limit the scope of the present invention. It is expected that alterations and further modifications, as well as other and further applications of the principles of the present invention will occur to others skilled in the art to which the invention relates and, while differing from the foregoing, remain within the spirit and scope of the invention as herein described and claimed. Where means-plus-function clauses are used in the claims such language is intended to cover the structure described herein as performing the recited functions and not only structural equivalents but equivalent structures as well. For the purposes of the present disclosure, two structures that perform the same function within an environment described above may be equivalent structures.

BRIEF DESCRIPTION OF THE DRAWINGS

These and further aspects of the present invention may be appreciated upon considering the accompanying drawings in which.

DETAILED DESCRIPTION OF THE PREFERRED EMBODIMENT

Figure 1:
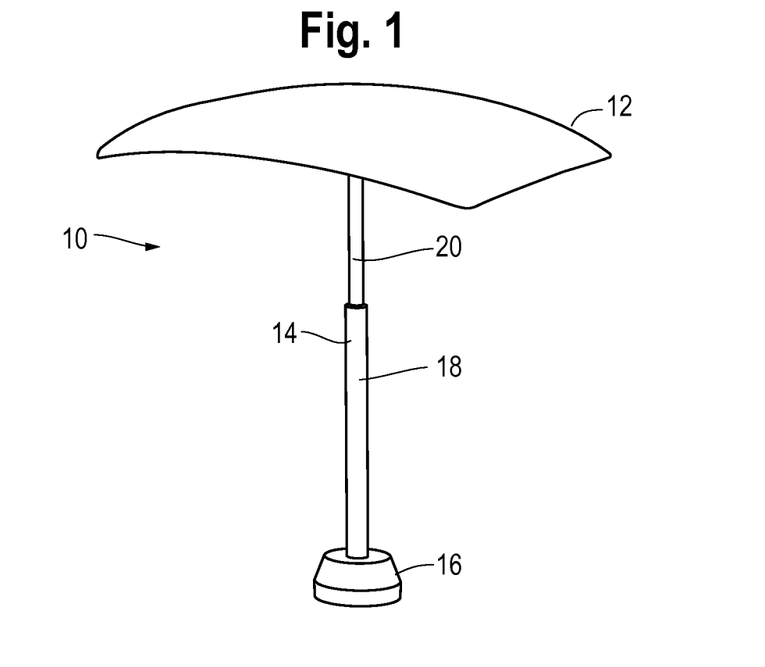
FIG. 1 is a perspective view of a fully deployed canopy assembly.

Referring now to FIG. 1, the numeral 10 indicates generally a canopy assembly embodying the principles of the present invention. Canopy assembly 10 has a canopy 12, a support column 14, and a base 16. Preferably, support column 14 comprises at least two telescoping sections, a lower telescoping section 18 and an upper telescoping section 20.

Canopy 12 is formed from a sturdy, lightweight and translucent or transparent material such as sheet thermoplastic material intended to provide both a thermal and vapor barrier while allowing sunlight to penetrate through to the protected vegetation.

Figure 2:
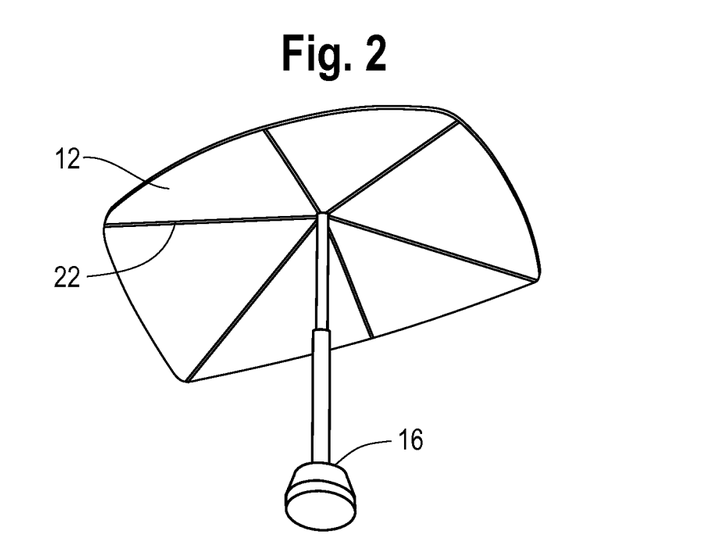
FIG. 2 is a perspective view of the canopy assembly shown in FIG. 1.

Referring now to FIG. 2, it can be seen that canopy 12 is supported by one or more struts 22 when it is in its deployed position. The raising and lowering of canopy 12 is preferably accomplished by use of a hydraulically operated system which may include a hydraulic motor housed in base 16 and may also include a series of hydraulic lines extending from an external pump and control system. Other motivators such as solar-powered electric motors, human power, or non solar-powered electric motors may also be used to raise and lower canopy 12.

Figure 3:
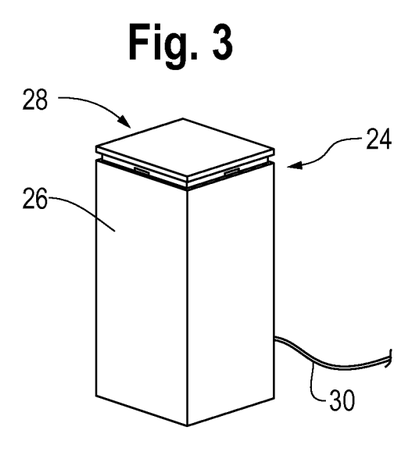
FIG. 3 is a schematic drawing showing a canopy assembly in its undeployed position.
Figure 7:
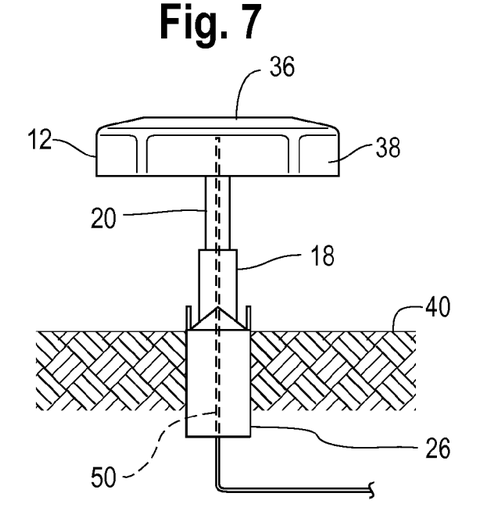
FIG. 7 is a side view of the canopy assembly shown in FIG. 6, further showing use of the canopy assembly with an irrigation line.

Referring now to FIG. 3, the numeral 24 identifies generally a housing within which the canopy assembly is placed. Housing 24 has a housing body 26 and a cover or lid assembly 28. The housing body 26 can be characterized as being elongate with a first or lower end and a second or upper end terminating in the aforementioned lid assembly 28. The housing body 26 has length between the upper and lower ends. Preferably, housing assembly 24 is buried such that the upper end lid assembly 28 is positioned approximately at ground level, that is, positioned such that housing body 26 is fully underground and the lower end is positioned below the upper end (FIG. 7).

An activation line 30 is shown, passing into housing body 26 and being connected to base 16. It should be understood that activation line 30 provides the impetus for deploying canopy assembly 10 and can take the form of a hydraulic line through which hydraulic fluid is pumped when deployment of canopy assembly 10 is desired. Activation line 30 can also take the form of an electrical connection providing a signal that activates a motor, pump or other driving mechanism located in base 16. It should also be understood that activation line 30 may be energized manually or automatically in response to a selected meteorological occurrence such as a drop in temperature, a change in humidity or a combination of factors preselected to deploy canopy assembly 10 when they occur. A signal can be sent informing users that the system has deployed or is about to deploy, and the parameter can be set to deploy the system in advance of the occurrence of the damaging conditions.

Figure 4:
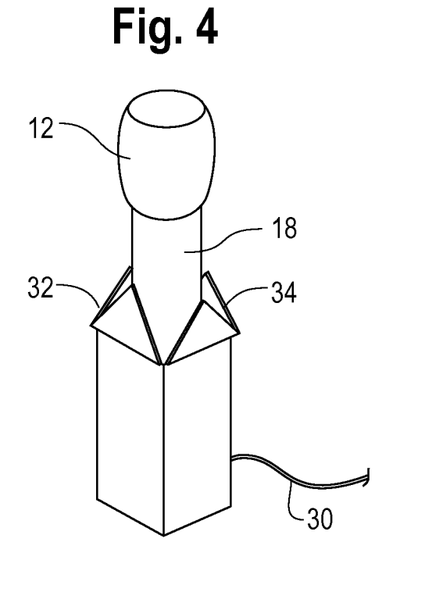
FIG. 4 shows the canopy assembly shown in FIG. 3 in a first stage of deployment.

Referring now to FIG. 4, canopy assembly 10 is shown in a first stage of deployment. As seen in FIG. 4, canopy 12 is furled or folded to allow canopy 12 to fit into housing body 26. As further seen in FIG. 4, lid assembly 28 may be formed from four triangular lid sections 32 with each section hingedly attached along its base 34 to housing body 26. As canopy assembly 10 deploys, each cover section 32 is moved upward allowing canopy 12 to exist housing body 26. As further seen in FIG. 4, lower column 18 has been deployed upward from housing body 26.

Figure 5:
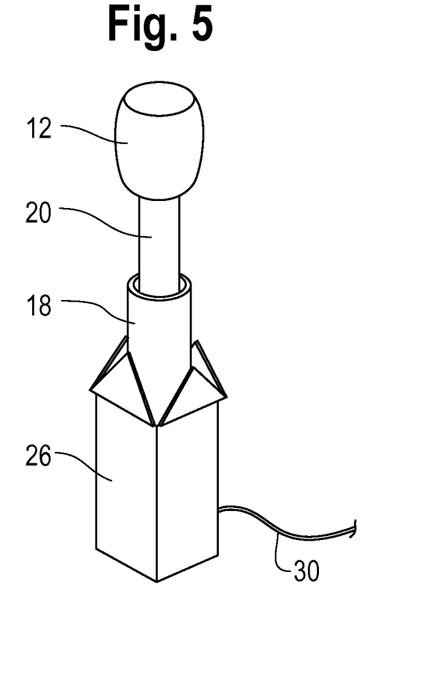
FIG. 5 shows the canopy assembly shown in FIG. 3 in a second stage of deployment.

Referring now to FIG. 5, a second stage of deployment is shown wherein lower telescoping section 18 is fully extended from housing body 26 and upper telescoping section 20 is now deploying upward.

Figure 6:
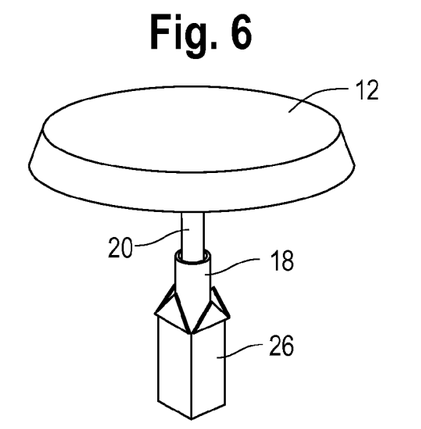
FIG. 6 shows the canopy assembly shown in FIG. 3 in a third stage of deployment.

Referring to FIG. 6, a third stage of deployment is shown wherein, in response to the upward motion of upper telescoping section 20, canopy 12 has been fully extended and is now held in place. As seen in FIG. 7, when deployed, canopy 12 has an upper surface 36 from which a skirt 38 depends around its entire perimeter. It is intended that skirt 38 act as a drip cap directing any liquid contacting or condensing on upper surface 36 away from the vegetation below.

Figure 8:
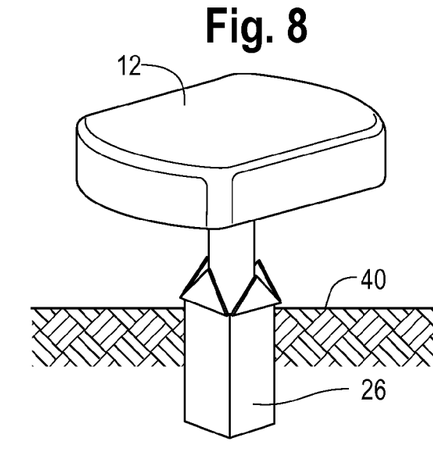
FIG. 8 shows the canopy assembly shown in FIG. 3 in a fourth stage of deployment.
Figure 9:
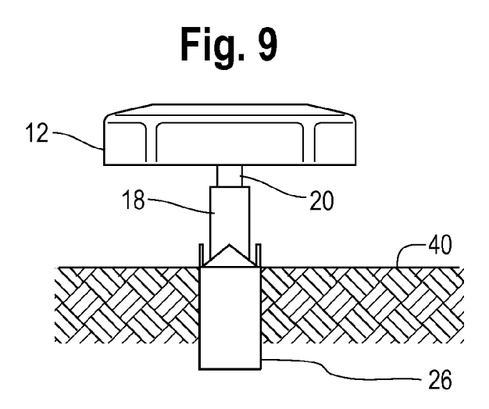
FIG. 9 is a side view of the canopy assembly shown in FIG. 8.

Referring now to FIG. 8, a fourth stage of deployment is shown in which, after fully deployment of canopy 12, upper telescoping section 20 is retracted to bring canopy 12 closer to ground surface 40. Stage four of the deployment is also shown in FIG. 9 where it can be seen that upper telescoping section 20 is now being withdrawn into lower telescoping section 18.

Figure 10:
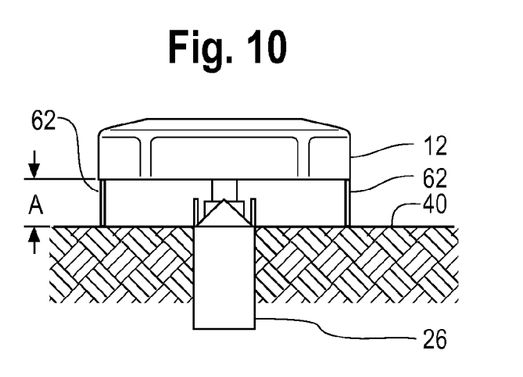
FIG. 10 is a side view of the canopy assembly shown in FIG. 3 in a fifth stage of deployment.

Referring now to FIG. 10, a fifth stage of deployment is shown wherein canopy 12 is also positioned a desired distance "A" above ground level 40. The selection of distance "A" will include such considerations as the height to which the crops planted at surface 40 have already grown and the type of weather condition against which the crops are being protected. For example, if the grower is concerned about frost, canopy 12 will be preferably positioned a smaller distance above ground level 40 to help retain heat being given off by the earth.

Figure 11:
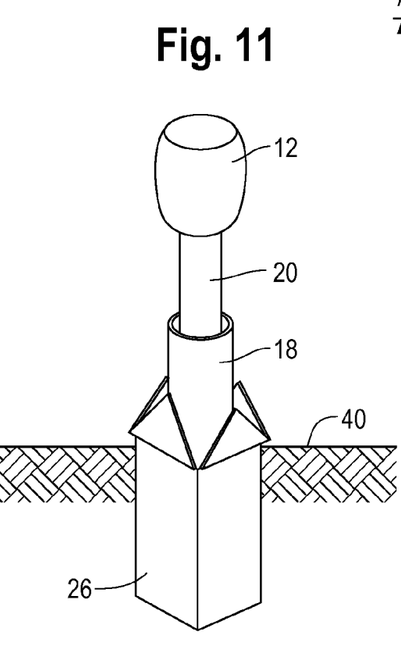
FIG. 11 is a perspective view of the canopy assembly shown in FIG. 3 as it is being retracted.

Referring now to FIG. 11, canopy 12 is shown having been refurled on top upper telescoping section 20 prior to being retracted into housing body 26.

Figure 12:
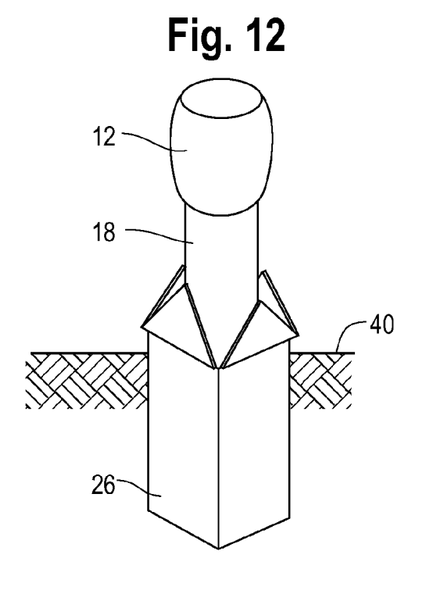
FIG. 12 is a perspective view of the canopy assembly shown in FIG. 3 showing a further stage of retraction.

Referring now to FIG. 12, retraction is further shown to the point that upper telescoping section 20 has been completely retracted into lower telescoping section 18 which, in turn, is retracted into housing body 26.

Figure 13:
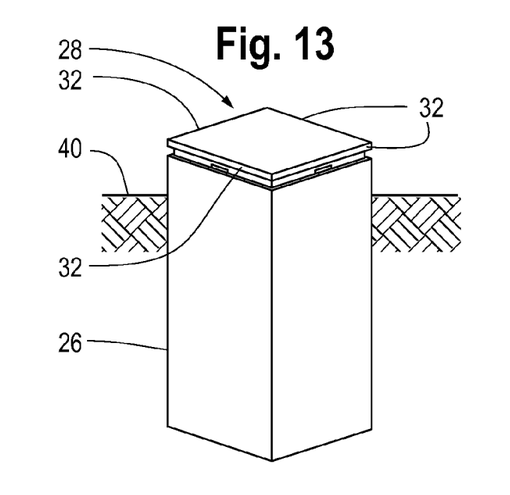
FIG. 13 is a perspective view of the canopy assembly shown in FIG. 3 fully retracted.

Referring now to FIG. 13, canopy assembly 10 has been fully retracted within housing body 26 and lid sections 32 of lid assembly 28 have hinged down to close off housing body 26.

Figure 14:
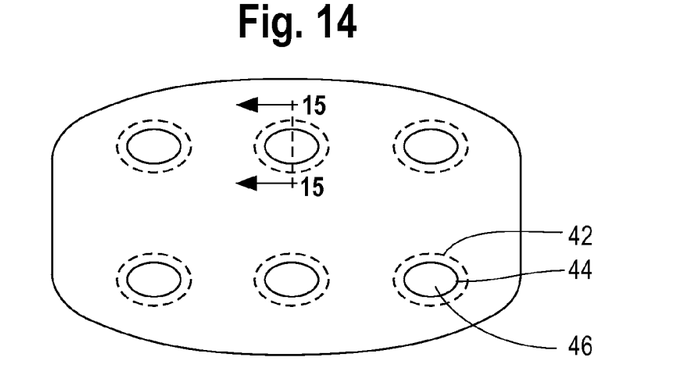
FIG. 14 is a top view of a portion of a canopy panel showing ventilation ports.

When canopy 12 is in a final, deployed position such as that shown in FIG. 8, it is often desirable to provide for air flow from beneath canopy 12 allowing the exchange of oxygen from the plants beneath canopy 12. As seen in FIG. 14, one or more ventilation ports 42 are provided for this purpose. Each ventilation port 42 has a ventilation aperture 44 closed off by a membrane 46.

Figure 15:
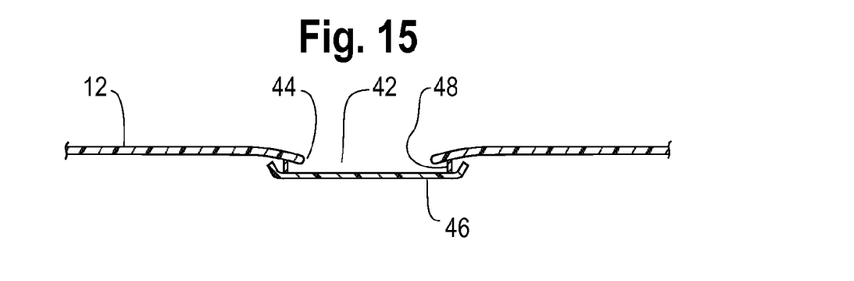
FIG. 15 is a section view along line 15-15 of FIG. 14.

As seen in FIG. 15, membrane 46 is attached to the underside of canopy 12 by hangers 48 and the space in between hangers 48 provides a venting action for airflow through ventilation port 42.

Under some circumstances, it may be desirable to provide a flow of liquid to the crops being protected. Such liquid can be a warming or anti-freeze liquid or in some instances a liquid containing fertilizer.

Figures 16, 17, 18:
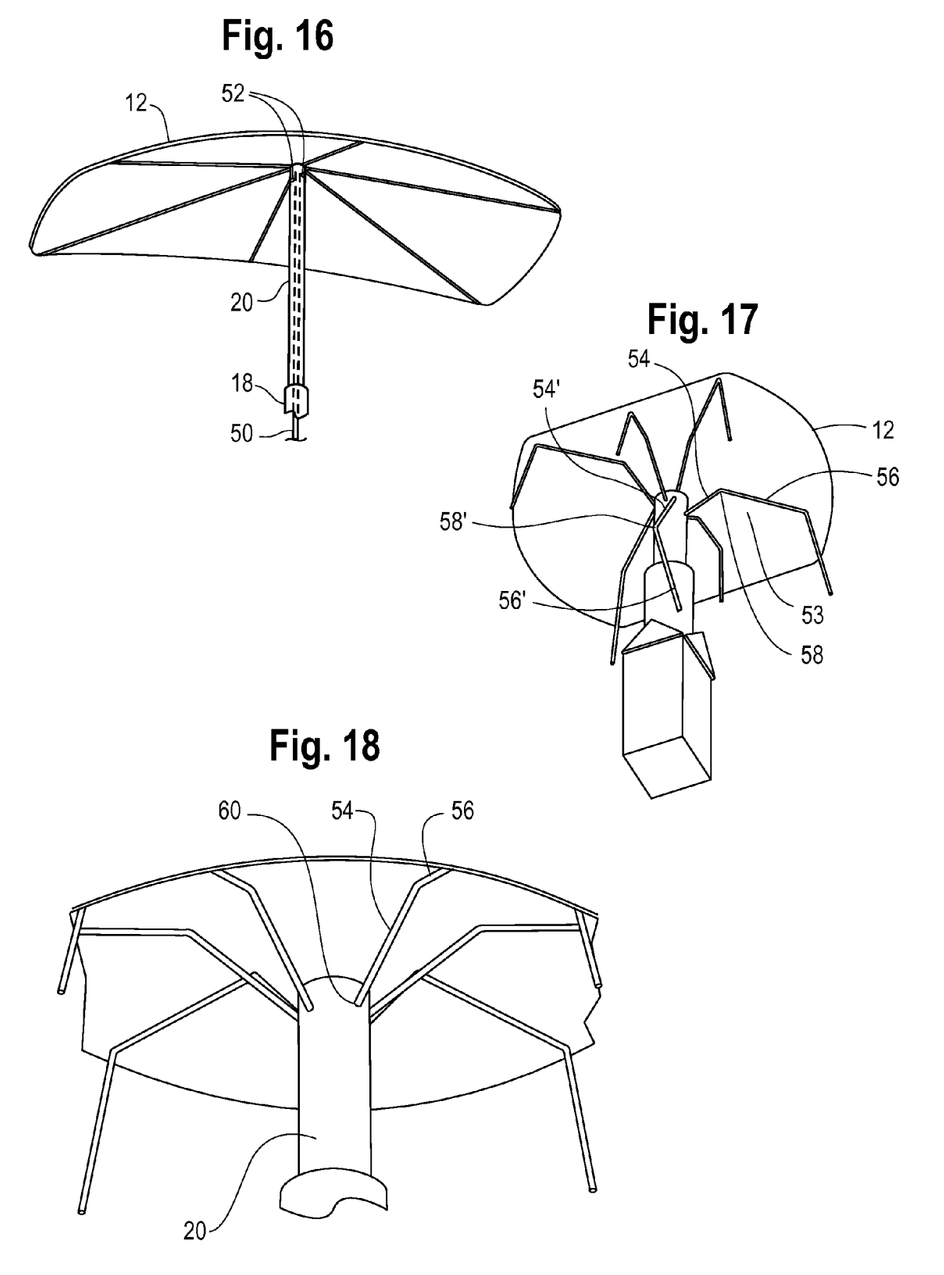
FIG. 16 is a perspective view of a canopy assembly showing an irrigation line.
FIG. 17 is a perspective view of a canopy assembly showing the supporting struts.
FIG. 18 is a detail view of FIG. 17.

Referring now to FIGS. 7 and 16, a fluid conduit 50 extends into housing body 26 and upwards through lower telescoping section 18 and upper telescoping section 20 and into the underside of canopy 12. As seen in FIG. 16, a spray outlet 52 is formed on upper telescoping section 20 and provides an egress point for liquid pumped through fluid conduit 50. The spray outlet may also be positioned atop upper telescoping section 20. Several such outlets 52 can be positioned along upper telescoping section 20 as needed or desired as seen in FIG. 16.

Referring now to FIG. 17, canopy 12 is shown in its fully deployed position, preferably, canopy 12 is supported by a series of struts exemplified by strut 53. Strut 53 has an inner strut 54 and an outer strut 56. Inner and outer struts 54 and 56 are angled with respect to one another and are attached to one another at joint 58. As further seen in FIG. 17, when canopy 12 is further retracted inner struts 54 and outer struts 56 and joint 58 take on the configuration shown at 54', 56', and 58'.

Referring now to FIG. 18, it can be seen that inner strut 54 is pivotally attached to upper telescoping section 20 at strut mount 60. The attachment at strut mount 60 allows inner strut 54 and, thereby, outer strut 56 to articulate from the position shown at 54', 56', 58' to the position shown in 54, 58, and 56 in FIG. 17.

Figure 19:
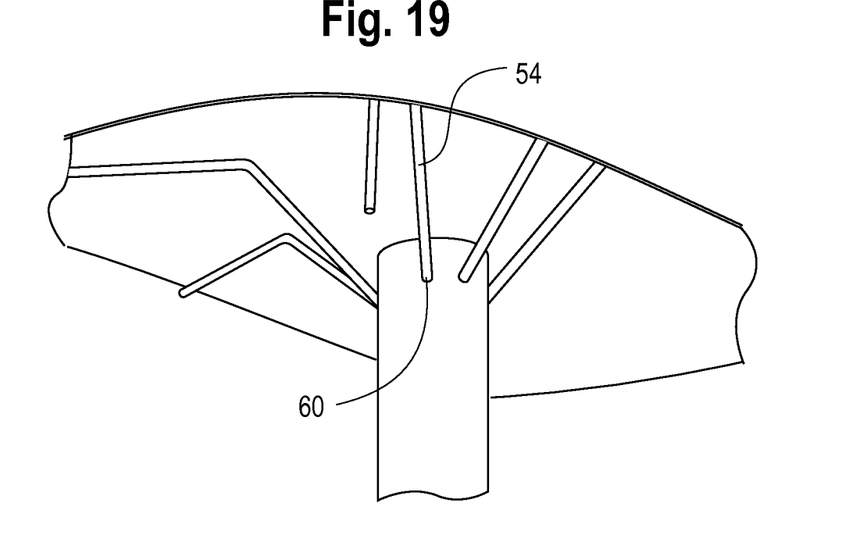
FIG. 19 is a detail view of FIG. 18.

Referring now to FIG. 19, inner strut 54 is shown protruding from strut mount 60. As described above, inner strut 54 articulates from its lowermost to its deployed position as lower and upper telescoping sections 18, 20 emerge and rise from housing body 26 (not illustrated in FIG. 19). One manner in which this articulation is accomplished is to attach a spring to that portion of inner strut 54 extending through strut mount 60, and to secure said spring within upper telescoping section 20 such that the spring is stretched when upper telescoping section 20 and lower telescoping section 18 deploy thereby pulling the end of inner strut 54 to pivot upwards.

Outer strut 56 is also moved upwards to push against the underside of canopy 12 and to deploy it upward and outward. A latch is also provided to latch strut 54 in place when lower and upper telescoping sections 18 and 20 are fully extended and to retain the latched condition while lower and upper telescoping sections 18, 20 are withdrawn to bring fully deployed canopy 12 closer to ground level 40. After use of the canopy is no longer required, lower and upper telescoping section 18, 20 are again deployed upward to a position where the latch is released and, thereafter, the weight of canopy 12 will cause struts 54, 56 to pivot downward to the position shown at 54', 56', thus allowing canopy 12 to "furl" so that it may fit back into housing body 26.

Figure 20:
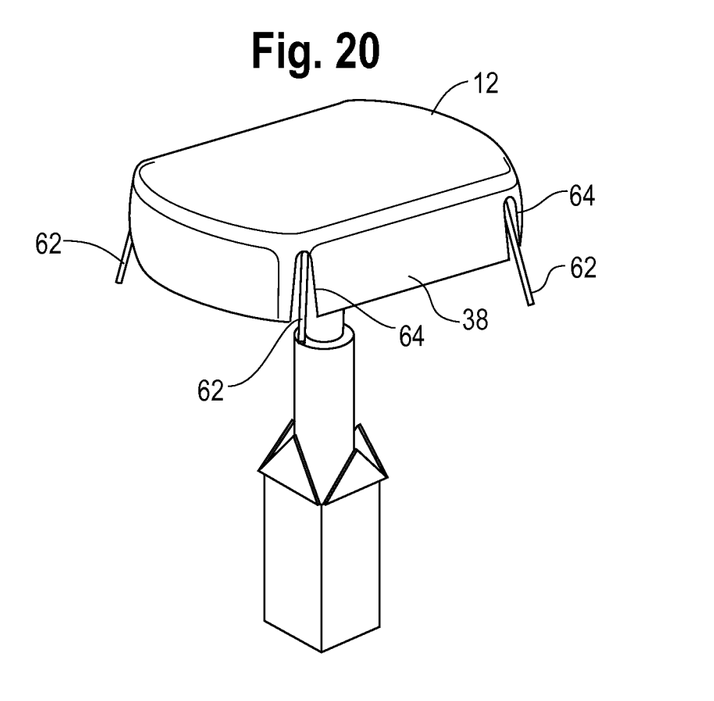
FIG. 20 is a perspective view of another embodiment of a canopy assembly with ground spikes.

Referring now to FIG. 20, a variation of the strut assembly is shown with a series of ground spikes 62. In the embodiment shown in FIG. 20, canopy 12 has a somewhat rectangular configuration and each depending skirt segment 38 has one or more apertures or slits 64 to allow ground spikes 62 to deploy therethrough.

Figure 21:
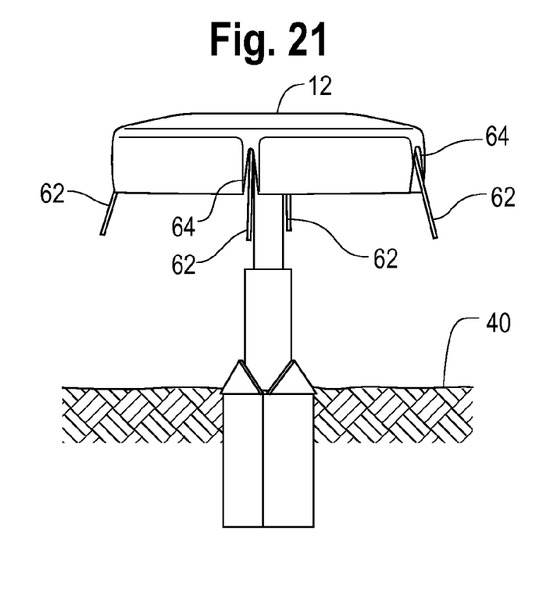
FIG. 21 is a side view of the canopy assembly shown in FIG. 20.

Referring now to FIG. 21, it can be seen that ground spikes 62 depend downwardly from canopy 12, are intended to contact ground level 40 when canopy 12 is lowered to its most protected position such as that shown in FIG. 10. Thus, the weight of the canopy may be supported by ground struts 62 in the event that ice or sleet for example forms on the surface of canopy 12. Ground struts 62 may also penetrate ground level 40 to provide stability for canopy 12 in high winds.

Figure 22:
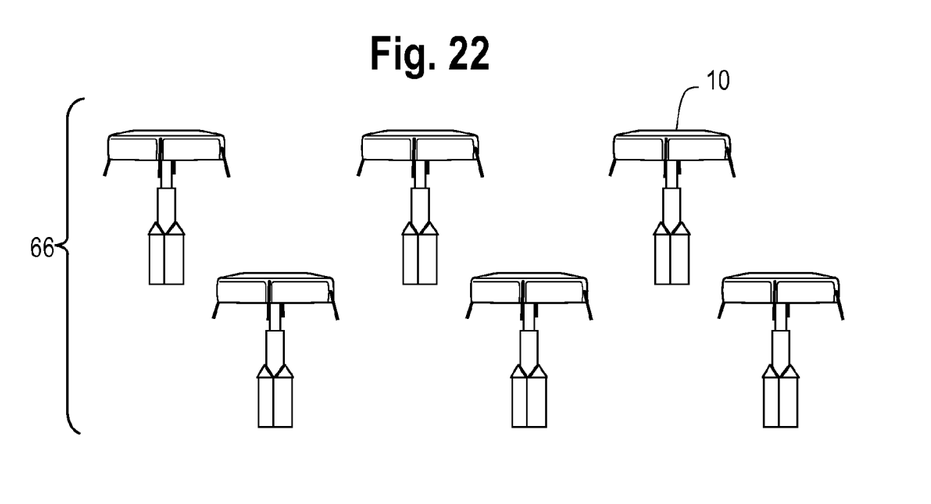
FIG. 22 is a schematic view of a number of canopies arranged in an array.

Referring now to FIG. 22 the numeral 66 identifies generally an array of canopy assemblies 10 arranged to cover a crop field. As described above and as can be appreciated, arrays of varying numbers of canopy assemblies can be installed to provide customized protection to fields of varying sizes and crop types.

The invention claimed is:

1. A system for protecting vegetation, said system comprising:
    an elongate housing body having a lower end, an upper end, and a length between said lower and upper ends, said housing body for being positioned substantially below ground level with said upper end being located proximal to ground level;
    a canopy assembly comprising a foldable canopy mounted to at least one column, said column being vertically extendable to raise said canopy; said canopy assembly having (i) a first, retracted position wherein said canopy assembly is fully retracted within said housing body length with said at least one column unextended; (ii) a second, deployed position wherein said at least one column extends beyond said length of said housing body;
    a motivator for extending and retracting said canopy assembly between said first and second positions; and
    a lid assembly rotatably connected to said housing body, said lid assembly having (i) an open condition to accommodate extension of said canopy assembly therethrough, and (ii) a closed condition, rotated away from said open condition, wherein said lid assembly covers said canopy assembly when said canopy assembly is in said first, retracted position.

2. The system of claim 1 wherein said canopy assembly has at least two extendable columns, and one of said at least two extendable columns being telescopically retained within, and extendable with respect to, the other of said at least two extendable columns.

3. The system of claim 1 wherein said canopy has a plurality of ventilation apertures, each of said plurality of ventilation apertures has a perimeter and has an oxygen permeable membrane fixedly attached around said perimeter.

4. The system of claim 3 wherein said membrane is connected to a lower surface of said canopy.

5. The system of claim 1 wherein said system further comprises at least one fluid conduit to dispense a selected liquid from said system.

6. The system of claim 5 wherein said liquid has a freezing point higher than that of water.

7. The system of claim 5 wherein said at least one fluid conduit extends within said at least one extendable column, said at least one fluid conduit in communication with at least one orifice proximal a distal end of said at least one column.

8. The system of claim 1 wherein said system further comprises at least one spike integrally formed on, and extending downwardly from, said canopy assembly to support said canopy assembly on the ground.

9. The system of claim 8 wherein said at least one spike extends from said canopy assembly through at least one slit in a skirt portion of said canopy.

10. The system of claim 1 wherein said canopy further comprises an upper surface having a perimeter from which a skirt depends to direct a fluid toward said perimeter.

11. The system of claim 1 wherein said lid assembly comprises a plurality of sections rotatably connected with said housing body.

12. The system of claim 1 wherein said canopy is at least partially penetrable by sunlight.

13. The system of claim 1 wherein said motivator is energized automatically in response to a predetermined meteorological condition to move said canopy assembly from said first, retracted position to said second, deployed position.

* * * * *